(12) United States Patent
Calabrese (10) Patent No.: US 9,869,763 B2
(45) Date of Patent: Jan. 16, 2018

(54) HIGH-RESOLUTION STRIPMAP SAR IMAGING

(71) Applicant: Thales Alenia Space Italia S.p.A. Con Unico Socio, Rome (IT)

(72) Inventor: Diego Calabrese, Rome (IT)

(73) Assignee: Thales Alenia Space Italia S.p.A. Con Unico Socio, Rome (IT)

( * ) Notice: Subject to any disclaimer, the term of this patent is extended or adjusted under 35 U.S.C. 154(b) by 345 days.

(21) Appl. No.: 14/766,211

(22) PCT Filed: Feb. 8, 2014

(86) PCT No.: PCT/IB2014/058872
§ 371 (c)(1),
(2) Date: Aug. 6, 2015

(87) PCT Pub. No.: WO2014/122624
PCT Pub. Date: Aug. 14, 2014

(65) Prior Publication Data
US 2016/0109570 A1    Apr. 21, 2016

(30) Foreign Application Priority Data

Feb. 8, 2013   (IT) .............................. TO2013A0108

(51) Int. Cl.
*G01S 13/90* (2006.01)
*G06T 1/00* (2006.01)
*G06T 7/60* (2017.01)

(52) U.S. Cl.
CPC .......... *G01S 13/9035* (2013.01); *G01S 13/90* (2013.01); *G06T 1/0007* (2013.01); *G06T 7/60* (2013.01);
(Continued)

(58) Field of Classification Search
CPC .. G01S 13/90; G01S 13/9035; G01S 13/9094; G01S 2013/9041; G01S 2013/9052; G01S 2013/907
(Continued)

(56) References Cited

U.S. PATENT DOCUMENTS 5,394,151 A * 2/1995 Knaell .................. G01S 7/4021
                                                        342/25 F
7,145,498 B2 * 12/2006 Cho ........................ G01S 13/90
                                                        342/161
(Continued)

FOREIGN PATENT DOCUMENTS

DE         10319063       11/2004

OTHER PUBLICATIONS

Curlander, J.C. et al., Synthetic Aperture Radar: Systems and Signal Processing, Wiley Series in Remote Sensing, Wiley-Interscience, 1991 (abstract and table of contents only).
(Continued)

*Primary Examiner* — Peter M Bythrow
(74) *Attorney, Agent, or Firm* — McCarter & English, LLP (57) ABSTRACT

A SAR imaging method performs N SAR acquisitions in stripmap mode of the earth's surface using a synthetic aperture radar transported by an aerial or satellite platform and including a single, non-partitioned antenna and a single receiver coupled thereto. All N SAR acquisitions are performed using the same predetermined elevation angle relative to the nadir of the synthetic aperture radar and using a respective squint angle relative to the flight direction of the synthetic aperture radar. Radar transmission and reception operations are time interleaved with other N-1 SAR acquisitions, resulting in the respective acquisition directions being parallel to each other and not parallel to acquisition
(Continued)

directions of other N-1 SAR acquisitions. Radar beams in two immediately successive time instants and related to two different SAR acquisitions are contiguous along the azimuth. SAR images may be generated using all the N SAR acquisitions having an enhanced azimuth resolution.

7 Claims, 7 Drawing Sheets (52) U.S. Cl.
CPC ............ *G01S 2013/9041* (2013.01); *G06T 2207/10044* (2013.01); *G06T 2207/30181* (2013.01)

(58) Field of Classification Search
USPC ..... 342/25 R, 25 A, 25 B, 25 C, 25 D, 25 E, 342/25 F
See application file for complete search history.

(56) References Cited

U.S. PATENT DOCUMENTS

| | | | | |
|---|---|---|---|---|
| 7,532,150 B1* | 5/2009 | Abatzoglou | ........ | G01S 13/9035 342/25 A |
| 7,705,767 B2* | 4/2010 | Fujimura | ........... | G01S 13/9035 342/175 |
| 8,049,657 B2* | 11/2011 | Prats | .................. | G01S 13/9035 342/25 A |
| 8,552,905 B2* | 10/2013 | Jin | ..................... | G01S 13/9035 342/25 R |
| 8,947,292 B2* | 2/2015 | Andersson | ............. | G01S 13/90 342/25 A |
| 2010/0207808 A1* | 8/2010 | Prats | ................... | G01S 13/9035 342/25 F |
| 2011/0175770 A1* | 7/2011 | Boufounos | ......... | G01S 13/9035 342/25 A |
| 2012/0105276 A1* | 5/2012 | Ryland | ............... | G01S 13/9035 342/25 F |
| 2012/0319892 A1* | 12/2012 | Calabrese | .......... | G01S 13/9023 342/25 C |
| 2014/0077989 A1* | 3/2014 | Healy, Jr. | ............... | G01S 13/90 342/25 F |

OTHER PUBLICATIONS

Currie et al., Wide-swath SAR, IEE Proceedings of Radar and Signal Processing, vol. 139, No. 2, pp. 122-135, 1992.
Franceschetti, G. et al., Synthetic Aperture RADAR Processing, CRC Press, Mar. 1999 (abstract and table of contents only).
Krieger, G. et al., Advanced Concepts for High-Resolution Wide-Swarth SAR Imaging, 8$^{th}$ European Conference on Synthetic Aperture Radar, pp. 524-527, 2010.
Mittermayer, J. et al., Bidirectional SAR Imaging Mode, IEEE Transactions on Geoscience and Remote Sensing, vol. 51, No. 1, pp. 601-604, 2013.
Italian Search Report and Written Opinion for TO2013A000108 dated Oct. 2, 2013.
PCT International Search Report and Written Opinion for PCT/IB2014/058872 dated May 27, 2014.
PCT/IB2014/058872, Feb. 8, 2014, WO/2014/122624.
TO2013A000108, Feb. 8, 2013.

* cited by examiner

HIGH-RESOLUTION STRIPMAP SAR IMAGING

TECHNICAL FIELD OF INVENTION

The present invention relates to remote sensing by means of Synthetic Aperture Radar (SAR) in general and, in particular, to an innovative method for high-resolution stripmap SAR imaging.

STATE OF THE ART

Figure 1:
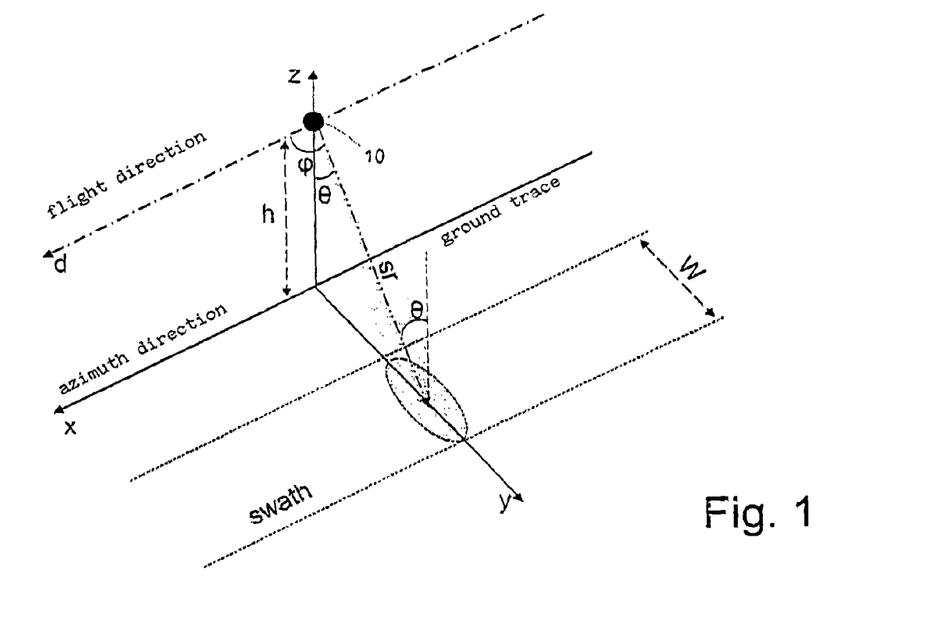
FIGS. 1 and 2 schematically show a typical acquisition geometry for SAR images in stripmap mode.

A typical reference geometry for generating SAR images of the earth's surface is shown in FIG. 1. With regard to this, it is wished to underline the fact that in FIG. 1 (and also in the following figures that will be presented and described hereinafter), the earth's surface is (and will be) shown "flat" only for convenience and simplicity of illustration and description, without any loss of generality.

In particular, FIG. 1 schematically shows a synthetic aperture radar (hereinafter called a SAR sensor, for simplicity of description) 10 that moves along a flight direction d at an altitude h (with respect to the earth's surface) assumed to be substantially constant. As is known, the altitude h of the SAR sensor 10 is measured along a nadir direction z that passes through said SAR sensor 10 (in particular it passes through the phase centre of the antenna of the SAR sensor 10) and is orthogonal to the earth's surface and the flight direction d. Conveniently, the SAR sensor 10 is transported in flight/orbit by an aerial/space platform (not shown in FIG. 1 for simplicity of illustration), such as, for example, an aircraft, or an unmanned aerial vehicle (UAV), or a satellite. The ground trace of the flight direction d identifies an azimuth direction x that is parallel to said flight direction d and orthogonal to the nadir direction z, while a cross-track direction y, which is orthogonal to both the nadir direction z and the azimuth direction x, together with the azimuth direction x, identifies an plane tangential to the earth's surface. In use, by means of an opportune antenna (not shown in FIG. 1 for simplicity of illustration), the SAR sensor 10 transmits radar pulses and receives the associated back-scattered signals in an acquisition direction sr that identifies the slant range and which forms an elevation angle θ with the nadir direction z and a squint angle φ with the flight direction d (or, equivalently, with the azimuth direction x) that, in the SAR acquisition geometry shown in FIG. 1, is equal to 90°.

Figure 2:
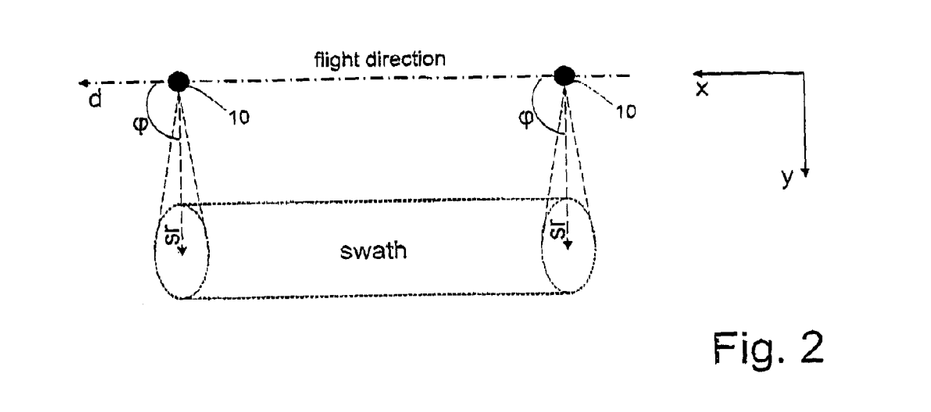

In particular, the SAR acquisition geometry shown in FIG. 1 regards the so-called stripmap mode, in which the SAR sensor 10 illuminates a strip of the earth's surface, known as swath, with radar pulses and then receives the associated back-scattered signals therefrom, said swath principally extending parallel to the azimuth direction x and having a given width W along the cross-track direction y. For greater clarity, FIG. 2 shows the geometry of SAR acquisition in stripmap mode in the x-y plane, where it is possible to observe how the squint angles φ are all the same (in particular, in the example shown in FIG. 2, the a squint angles φ are all right angles).

SAR technology can be considered a mature technology; in fact, nowadays there are countless articles, manuals, patents and patent applications that describe the characteristics and potential thereof; in this regard, reference can be made to:

- the article by Josef Mittermayer et, al. entitled "*Bidirectional SAR Imaging Mode*", IEEE Transactions on Geoscience and Remote Sensing, vol. 51, no. 1, 1 Jan. 2013, pages 601-614, which hereinafter will be indicated, for simplicity of description, as Ref1 and which describes a mode for creating bidirectional SAR images;
- German patent application DE 103 19 063 A1, which hereinafter will be indicated, for simplicity of description, as Ref2 and which relates to a SAR antenna method and system having a plurality of antenna elements for generating multiple SAR beams;
- the article by A. Currie et al. entitled "*Wide-swath SAR*", IEE Proceedings of Radar and Signal Processing, vol. 139, no. 2, 1 Apr. 1992, pages 122-135, which hereinafter will be indicated, for simplicity of description, as Ref3 and which describes various methods for widening the swath observable via a SAR;
- the article by G. Krieger et al. entitled "*Advanced Concepts for High-Resolution Wide-Swath SAR Imaging*", 8th European Conference on Synthetic Aperture Radar, 7 Jun. 2010, pages 524-527, which hereinafter will be indicated, for simplicity of description, as Ref4 and which presents various concepts regarding multi-channel SAR systems for creating high-resolution wide-swath SAR images;
- the book by J. C. Curlander and R. N. McDonough entitled "*Synthetic Aperture Radar: Systems and Signal Processing*", Wiley Series in Remote Sensing, Wiley-Interscience, 1991, which hereinafter will be indicated, for simplicity of description, as Ref5 and which is a manual on SAR systems; and
- the book by G. Franceschetti and R. Lanari entitled "*Synthetic Aperture RADAR Processing*", CRC Press, March 1999, which hereinafter will be indicated, for simplicity of description, as Ref6 and which is another manual on SAR systems.

As is known, the azimuth resolution for a SAR acquisition in stripmap mode is a function of the angular aperture (or angular difference–delta angle) with which a target is observed by the SAR sensor; or, equivalently, the azimuth resolution can also be seen as a function of the time difference (delta time), related to the velocity of the SAR sensor, with which the target is observed. In particular, the azimuth resolution can be expressed by the following equation (for further details, please refer to Ref3, Ref5 and Ref6):

$$res = \frac{0.886\lambda}{2 * \text{delta\_angle}},$$

where res indicates the azimuth resolution, λ indicates the wavelength used by the SAR sensor and delta_angle indicates the angular aperture (or angular difference–delta angle) with which the target is observed by the SAR sensor.

Assuming the angle as a 3 dB aperture (one-way) of the antenna (=0.886λ/L, where L indicates the physical or equivalent length along the azimuth direction of the antenna of the SAR sensor), the constraint traditionally associated with the azimuth resolution for the stripmap mode can be obtained, which is equal to L/2 (for further details, please refer to Ref3, Ref5 and Ref6).

Figure 3:
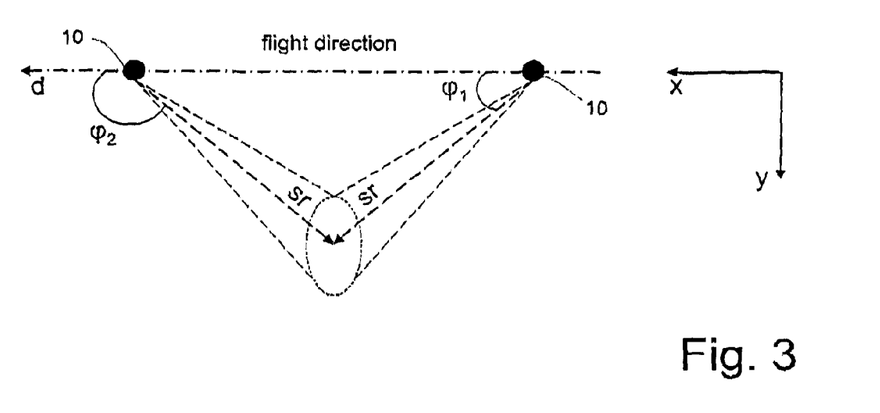
FIG. 3 schematically shows a typical acquisition geometry for SAR images in spotlight mode.

Currently, very wide antenna beams are used to improve the azimuth resolution, these being achieved through the use of antennas of small size or under-illuminated or with amplitude and/or phase modulation such as to reduce the equivalent size, or by using the so-called spotlight mode, the acquisition logic of which is schematically illustrated in FIG. 3.

In particular, as shown in FIG. 3, the SAR acquisition logic in spotlight mode envisages using a continuous, or quasi-continuous, steering of the antenna beam during the flight movement of the SAR sensor 10 (by dynamically adjusting the value of the squint angle φ) so as to illuminate a same area of interest with the radar pulses and then receive the associated back-scattered signals therefrom, in this way increasing the persistence time of the SAR sensor 10 on said area of interest and thus improving the azimuth resolution.

Both of the above-stated methodologies used for improving the azimuth resolution suffer from some drawbacks. In particular, the use of very wide antenna beams requires using very high transmission powers, while the spotlight mode introduces limitations on the azimuth length of the swaths.

As indicated in the literature, mathematical relations exist that link the parameters of the operational modes. In particular, azimuth sampling dictates that the transmission/reception pulse repetition frequency (PRF) is linked to the size of the beam and to the velocity of the SAR sensor (for further details, please refer to Ref3, Ref5 and Ref6):

$$PRF > \frac{2\alpha v}{L},$$

where α is a parameter dependent on the desired level of ambiguity, v indicates the velocity of the SAR sensor and L indicates the physical or equivalent length along the azimuth direction of the antenna of the SAR sensor.

The value of PRF limits the extension of the measured area (swath) in range (for further details, please refer to Ref3, Ref5 and Ref6)

$$\Delta R < \left(\frac{1}{PRF} - 2\tau\right)\frac{c}{2},$$

where ΔR indicates the extension of the measured area (swath) in range, τ indicates the time interval (or duration) of the pulse transmitted and c indicates the speed of light.

In order to exploit the capabilities of a SAR system to the maximum, in addition to the stripmap and spotlight modes, various other techniques have proposed over the years for using SAR sensors, which can be grouped into three main modes:
- burst mode;
- space-division mode; and
- angle-division mode.

The main burst mode is the ScanSAR mode, which divides time into synchronous bursts (i.e. with a regular rate). A scene portion at the antenna's nominal PRF is acquired in each burst, in such a way that the azimuth spectrum is correctly sampled (for further details, please refer to Ref3, Ref5 and Ref6), but for a shorter time (and therefore a smaller delta angle). This time division enables switching the beam, in subsequent bursts, in other directions in order to increase the swath in range. In practice, the "azimuth time" is divided into $N_b$ bursts and a different strip is acquired at each burst. The greatest contraindication of this mode is that by reducing the acquired delta angle, the azimuth resolution deteriorates. In particular, the constraint of continuous coverage that guarantees the absence of "holes" in the strips implicates that the best azimuth resolution cannot be less than (i.e. better than) a certain amount (for further details, please refer to Ref3, Ref4, Ref5 and Ref6); in particular it is found that:

$$res_{ScanSar} \geq (N_b+1) res_{Strip}$$

where $res_{ScanSar}$ indicates the ScanSAR resolution and $res_{Strip}$ indicates the stripmap reference resolution (i.e. L/2).

The TOPS mode (for further details, please refer to Ref4) is also numbered among the burst modes; this mode exploits the azimuth steering capability and requires a scanning direction opposite to that of the spotlight mode, i.e. comparable to a sweep rather than a re-centring. That is, in each burst, the initial azimuth steering ensures that the SAR sensor "looks" backwards and then points forwards at the end of the burst. This ensures that, unlike the conventional ScanSAR mode, each target is illuminated by the entire antenna pattern and this enables equalizing the radiometric response and the azimuth ambiguities. As happens with the prescribed ScanSAR mode, in the TOPS mode (which is also a burst mode) as well, the targets are always seen by the sensor with a smaller delta angle (or delta time) than that typical of the stripmap mode. It follows that also the TOPS mode, just like ScanSAR (even if with different equations/constraints with respect to the traditional ScanSAR), allows extending the swath in range at the cost of degrading the azimuth resolution with respect to the stripmap mode. These concepts are summarized in Ref4, where in the introduction it is stated: "Examples are the ScanSAR (or TOPS) mode which enables a wide swath at the cost of an impaired azimuth resolution and the Spotlight mode which allows for an improved azimuth resolution at the cost of a noncontiguous imaging along the satellite track".

As previously seen, the requirements of having wide swaths and high resolutions are in mutual conflict. On the one hand, a low PRF is preferred to have "more time" to acquire a wide scene in the across-track elevation plane, while on the other, a wide antenna beam would be preferred to improve the azimuth resolution. However, this last characteristic would require a high PRF, thereby being in contrast with the first requirement. In order to overcome these problems, techniques have been proposed in the past that use space-division modes, such as, for example, the Displaced Phase Centres (DPC) technique (for further details, please refer to Ref3 and Ref4), which requires the use of multiple reception antennas. This can be achieved by using multiple SAR sensors, or by segmenting a single antenna and using multiple reception systems: a wide beam is transmitted (small antenna size L) and then simultaneously received with M antennas (of small size like the one in transmission) arranged along the azimuth direction. The use of multiple reception elements allows having a larger number of azimuth samples and therefore using a lower physical PRF (for further details, please refer to Ref3 and Ref4). The biggest contraindication of this technique is the complexity; in fact, this technique requires the simultaneous use of M receivers and M "small" antennas (or a large one partitioned into M sub-blocks) and therefore requires high transmission power to achieve adequate product sensitivity. Furthermore, the literature points out some critical areas at the algorithm level regarding sensitivity to errors of knowledge of the M phase centres, as well as the effects on the ambiguity level. There are some variants in the literature that try to reduce these critical areas, such as the High Resolution Wide-Swath (HRWS) technique, which also envisages partitioning in elevation in order to "follow" the beam in elevation, thereby increasing directivity and consequently product sensitivity.

The aim of the techniques that use angle-division modes is similar to that of the techniques that use space-division modes, but the additional samples are acquired by sampling in different directions. In particular, there are two main logics: angular division in elevation and angular division in azimuth.

Angular division in elevation (with regard to this, reference can be made, for example, to the Multiple Elevation Beam (MEB) technique described in Ref4) envisages the simultaneous acquisition with multiple antenna/reception systems and a single transmitter (with wide swath), or more directive transmissions (for further details, please refer to Ref3 and Ref4). In this way, a plurality of acquisitions is obtained in stripmap mode with nominal azimuth resolutions (approximately L/2). To reduce the problems of range ambiguities, the literature proposes squinting the individual beams in elevation.

Instead, angular division in azimuth (with regard to this, reference can be made, for example, to the Single Phase Centre MultiBeam (SPCMB) technique described in Ref3) envisages transmission via a single, wide beam and simultaneous reception via M narrower beams. In this way, wide beam is obtained (improving resolution), but similarly to the spotlight mode, the single reception channels correctly sample a different angle portion. These channels will then be recombined during processing in order to obtain a synthesized delta angle M times greater, consequently improving the resolution (for further details, please refer to Ref3 and Ref4). In general, the angular division in azimuth techniques have many critical areas with respect to the level of ambiguity; in fact, the lateral lobes of the antenna in transmission and of the single antennas in reception interact, raising the level of the ambiguities.

Also in this case, the biggest contraindication of the angular division techniques is the complexity; in fact, these techniques contemplate the simultaneous use of M receivers and M "small" antennas (or a large one partitioned into M sub-blocks) and therefore require high transmission power to achieve adequate product sensitivity.

The space and angle division concepts are well summarized in Ref4, which in section 2 states; "Several proposals resolve the azimuth resolution vs. wide swath coverage dilemma by combining a multi-channel radar receiver with a small aperture transmitter illuminating a wide area on the ground. Examples are the squinted multiple beam SAR . . . , the displaced phase centre antenna (DPCA) technique . . . , the Quad Array SAR system . . . , and the High-Resolution Wide-Swath (HRWS) SAR system".

Although the aim is different, the bidirectional SAR imaging mode (BiDi—for further details, please refer to Ref1) should also be counted amongst the angle division techniques. By exploiting the azimuth grating lobes of a phased array antenna or working at different times, this mode simultaneously acquires two different images: one regarding the scene ahead and the other regarding the scene aft. The azimuth angular difference is the equivalent of a time difference, i.e. a same scene seen at different times, and therefore it is possible to identify moving objects in the scene by comparing images. It is important to underline that this technique expects the two acquisitions to be angularly separated in azimuth, i.e. it is not possible to combine the data of the two channels to reconstruct an image with higher resolution.

In the conclusion of Ref1, it is stated: "The BiDi short-term series can be used for change and velocity detection . . . . The possibilities of the BiDi imaging mode in terms of velocity measurement is the subject of future research work. Further possible applications of BiDi include high accuracy measurement of along-track displacement by the exploitation of the widely separated Doppler spectra".

Finally, although the SAR technology can be developed with different type of antenna, the one that offers the greatest flexibility of use is the so-called "phased array" type, which allows rapid switching of the acquisition direction. Other types of antenna can be used, such as that described in Ref2, for example.

OBJECT AND SUMMARY OF THE INVENTION

The object of the present invention is that of providing a stripmap SAR imaging method that enables achieving better azimuth resolutions with respect to those obtainable with current SAR acquisition techniques of the stripmap type, and which does not suffer from the previously described drawbacks. The above-stated object is achieved by the present invention insofar as it relates to a SAR imaging method and a SAR system, as defined in the appended claims.

In particular, the SAR imaging method according to the present invention comprises performing N SAR acquisitions in stripmap mode of areas of the earth's surface by means of a synthetic aperture radar that is transported by an aerial or satellite platform and which comprises a single, non-partitioned antenna and a single receiver coupled to said single, non-partitioned antenna, where N is an integer greater than one.

All N SAR acquisitions in stripmap mode are performed using one and the same predetermined elevation angle with respect to the nadir of the synthetic aperture radar so that said N SAR acquisitions in stripmap mode all regard one and the same specific swath of the earth's surface.

Each SAR acquisition in stripmap mode is performed using a respective squint angle with respect to the flight direction of the synthetic aperture radar, wherein said respective squint angle is different from the squint angles used to perform the other N-1 SAR acquisitions in stripmap mode.

Furthermore, each performed SAR acquisition in stripmap mode comprises respective radar transmission and reception operations that:
  are time interleaved, individually or in groups, with single, or groups of, radar transmission and reception operations of the other N-1 SAR acquisitions in stripmap mode performed; and
  comprise the transmission and reception of respective radar beams in respective acquisition directions that are defined by the predetermined elevation angle and by the respective squint angle used for said SAR acquisition in stripmap mode, thereby resulting in that said respective acquisition directions are parallel to each other and not parallel to the acquisition directions of the other N-1 SAR acquisitions in stripmap mode performed.

In particular, the radar beams transmitted and received in two radar transmission and reception operations performed in two immediately successive time instants and related to two different SAR acquisitions in stripmap mode are contiguous along the azimuth, thereby increasing the integration times with respect to those obtainable via any single one of the N SAR acquisitions in stripmap mode performed.

Finally, the SAR imaging method according to the present invention also comprises generating SAR images of areas of the specific swath on the basis of all the N SAR acquisitions in stripmap mode performed, said SAR images having an azimuth resolution that is enhanced by a factor up to N with respect to a nominal stripmap azimuth resolution, which is equal to half the physical or equivalent length along the azimuth direction of the single, non-partitioned antenna of the synthetic aperture radar.

BRIEF DESCRIPTION OF DRAWINGS

For a better understanding of the present invention, some preferred embodiments, provided by way of non-limitative example, will now be described with reference to the attached drawings (not to scale), where.

DETAILED DESCRIPTION OF PREFERRED EMBODIMENTS OF THE INVENTION

The following description is provided to enable an expert in the field to embody and use the invention. Various modifications to the embodiments shown will be immediately obvious to experts and the generic principles described herein could be applied to other embodiments and applications without departing from the scope of protection of the present invention.

Thus, the present invention is not intended to be limited to just the embodiments described and shown herein, but is to be accorded the widest scope consistent with the principles and features disclosed herein and defined in the appended claims.

The present invention derives from the applicant's insight to exploit the steering capability of the antennas used in the SAR sensors in a non-conventional manner. The applicant then conceived a multi-beam and multi-temporal SAR acquisition technique that exploits the transmission and reception characteristics of a SAR sensor in time-sharing.

In particular, the idea on which the present invention is based is that of dividing a SAR acquisition in stripmap mode into N elemental acquisitions in stripmap mode (with N>1) and to combine them so as to obtain SAR images with an azimuth resolution up to N times better than that obtained with conventional techniques of stripmap SAR acquisition.

Specifically, a first aspect of the present invention concerns performing several SAR acquisitions interleaved at pulse repetition interval (PRI) level, which represents the time between two consecutive transmitted pulses, in particular SAR acquisitions in which the azimuth acquisition direction of the antenna, namely the squint angle used, changes at PRI level.

In detail, by using an increased pulse repetition frequency PRF (where PRF=1/PRI), N stripmap acquisitions can be obtained, individually having PRFs compatible with the antenna's size (in this way, azimuth ambiguity values are not altered), such that the sum of the various squint angles used can synthesize an antenna with a larger beam (up to N times larger). By integrating the N squint angles and compensating the amplitude modulation, it is possible to obtain a SAR image having an azimuth resolution N times better (i.e. smaller by a factor of N with respect to nominal stripmap mode resolution of L/2). Differently from the spotlight mode, the azimuth acquisition direction of the antenna is changed without "following" a predetermined area and, in consequence, no constraint is introduced regarding the azimuth size of the swath.

The PRF used is N times greater than the natural, nominal PRF of the antenna considered, that is to say it has the same value of a PRF employed on an antenna N times smaller (i.e. the size necessary for obtaining the same azimuth resolution with the traditional techniques).

The advantage is that a larger antenna allows achieving significantly higher sensitivity performance for the same transmitted power, or using significantly less transmission power for the same performance. In addition, because the antenna is larger, the power density in transmission (obtained by dividing the transmitted power by the antenna's surface) is significantly reduced. The fact of using a physically larger antenna also makes the system much more flexible, as it is compatible with lower PRF modes and therefore with SPOT/STRIP/SCAN acquisitions at a lower resolution, but with significantly better (i.e. significantly larger) swaths.

Although the technique of SAR acquisition in stripmap mode according to the above-stated first aspect of the present invention can be used with a generic integer N greater than one, hereinafter, for simplicity of description and without loss of generality, examples will be shown for N=2, it being understood that the concepts explained hereinafter in relation to the case N=2 are also applicable mutatis mutandis in the case of a generic integer N greater than one.

Figure 4:
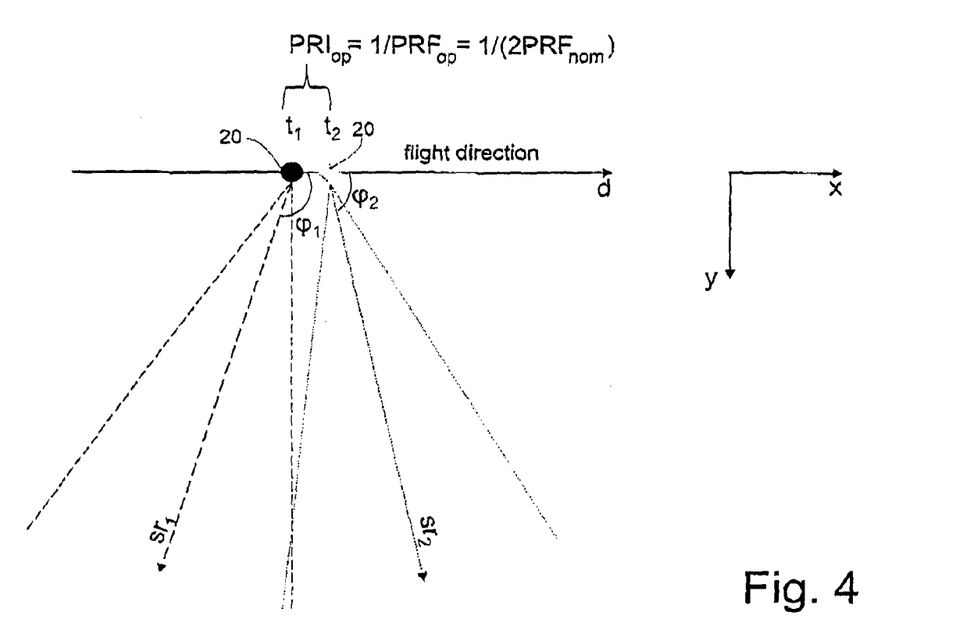
FIGS. 4 and 5 schematically show an example of logic for SAR acquisition in stripmap mode according to a first aspect of the present invention.
Figure 5:
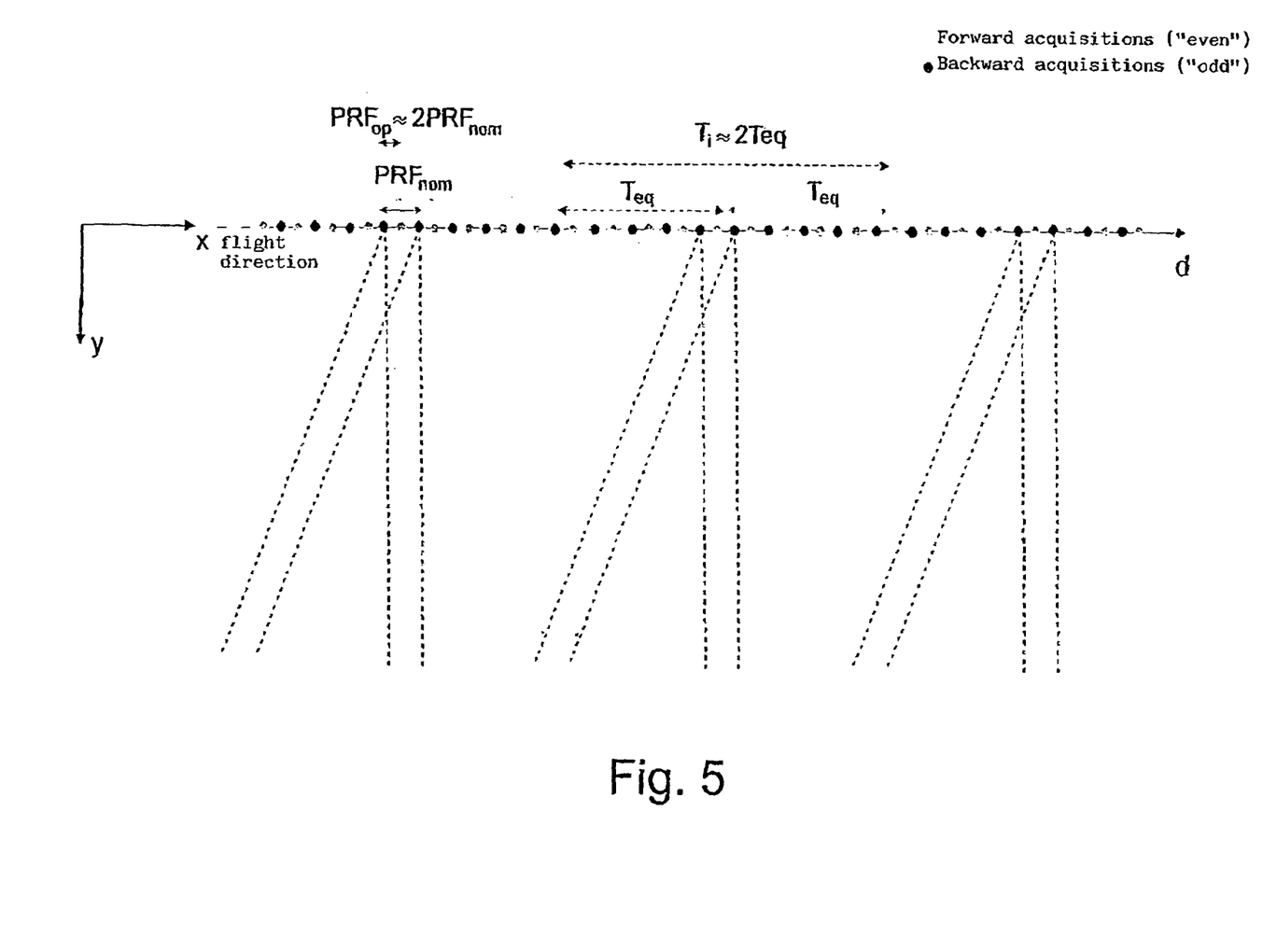

For a better understanding of the first aspect of the present invention, FIGS. 4 and 5 schematically show an example of logic of SAR acquisition in stripmap mode according to said first aspect of the present invention in the case of N=2.

In particular, FIG. 4 (in which the Cartesian reference system used substantially corresponds to that previously introduced for FIGS. 1-3) shows, in the x-y plane, a SAR sensor 20 that:

is equipped with a single, non-partitioned antenna (not shown in FIG. 4 for simplicity of illustration) that is coupled to a single receiver (not shown in FIG. 4 for simplicity of illustration) and is associated with a given nominal pulse repetition frequency $PRF_{nom}$; and is transported in flight/orbit along a flight direction d by an aerial/space platform (not shown in FIG. 4 for simplicity of illustration), such as, for example, an aircraft, a UAV, a helicopter, or a satellite.

In the example shown in FIG. 4, the SAR sensor 20 is used with an operational pulse repetition frequency $PRF_{op}$ twice that of the antenna's nominal pulse repetition frequency (i.e., $PRF_{op}=2PRF_{nom}$) so as to transmit successive pulses at a temporal distance $PRI_{op}=1/(2PRF_{nom})$. In particular, as shown in FIG. 4, the SAR sensor 20 is used to transmit and receive:

at a first time instant $t_1$, a first radar beam in a first acquisition direction $sr_1$ oriented with respect to the azimuth direction x, i.e. with respect to the flight direction d, along a first squint angle $\varphi_1$; and, at a second time instant $t_2$ (with $t_2-t_1=PRI_{op}$), a second radar beam in a second acquisition direction $sr_2$ oriented with respect to the azimuth direction x, i.e. with respect to the flight direction d, along a second squint angle $\varphi_2$ different from squint angle $\varphi_1$.

In detail, the SAR sensor 20 performs:

at the first time instant $t_1$, a first SAR acquisition backwards (namely with $\varphi_1 > 90°$); and at the second time instant $t_2$, a second SAR acquisition forwards (namely with $\varphi_2 < 90°$).

As shown in FIG. 4, the two radar beams transmitted and received in the two acquisition directions $sr_2$ and $sr_2$ are contiguous along the azimuth, in this way allowing the integration times to be increased (in particular, doubled) with respect to those of traditional stripmap techniques for a given antenna.

The two SAR acquisitions shown in FIG. 4 represent the elemental acquisitions of a total SAR acquisition in stripmap mode that is shown in FIG. 5, where it can be seen how a series of backward SAR acquisitions (hereinafter also referred to as odd acquisitions for simplicity of description) and a series of forward SAR acquisitions (hereinafter also referred to as even acquisitions for simplicity of description) are performed with interleaving at PRI level, that is to say by always alternating a backward SAR acquisition with a forward SAR acquisition, i.e. by alternating use of the first squint angle $\varphi_1$ with use of the second squint angle $\varphi_2$, As previously mentioned, the radar beams of odd and even acquisitions performed at immediately successive time instants are contiguous along the azimuth so as increase (in particular, to double) the integration times with respect to those obtainable via traditional stripmap techniques for a given antenna. In other words, the azimuth width of the radar beams and the variation of the squint angle are such that to guarantee azimuth contiguity of the radar beams and, consequently, an increase (in particular, a doubling) of the integration times.

Figure 6:
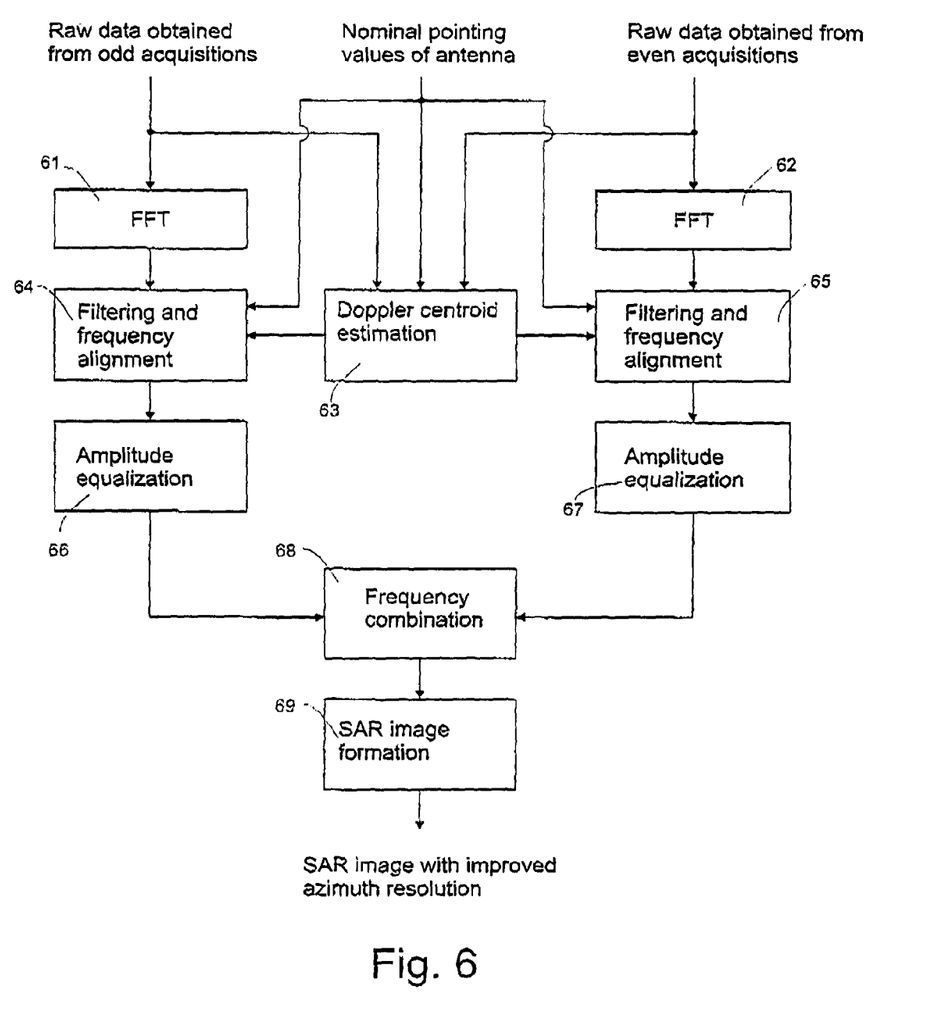
FIG. 6 schematically shows a method of processing data acquired by using the logic for SAR acquisition in stripmap mode in FIGS. 4 and 5.

A flowchart is shown FIG. 6 that represents a method of processing the data acquired using the technique of SAR acquisition in stripmap mode shown in FIG. 5.

In particular, as shown in FIG. 6, said processing method comprises:

applying a Fast Fourier Transform (FFT) to both the raw data obtained from the odd acquisitions (block 61) and the raw data obtained from the even acquisitions (block 62), so as to obtain, respectively, a first raw spectrum and a second raw spectrum;

estimating the values of the Doppler centroid on the basis of the raw data obtained from the odd and even acquisitions and, conveniently, also on the basis of the nominal pointing values of the antenna (block 63);

performing filtering and frequency alignment of the first raw spectrum (block 64) and of the second raw spectrum (block 65) on the basis of the estimated values of the Doppler centroid and the nominal pointing values of the antenna so as to obtain, respectively, a first spectrum correctly positioned in frequency and a second spectrum correctly positioned in frequency;

applying an equalization of the amplitude modulation to both the first spectrum correctly positioned in frequency (block 66) and the second spectrum correctly positioned in frequency (block 67) so as to obtain, respectively, a first equalized spectrum and a second equalized spectrum;

frequency combining the first equalized spectrum with the second equalized spectrum (block 68) so as to obtain a final spectrum having twice the size of that of the first and second raw spectra; and forming a SAR image on the basis of the final spectrum (block 69), said SAR image having an azimuth resolution that is half (i.e. two times better) that of the SAR image formed on the basis of just the raw data obtained from the odd acquisitions or just the raw data obtained from the even acquisitions.

It is important to underline the fact that with the proposed technique it is possible to correlate the values of the Doppler centroids of the odd and even acquisitions via the nominal values linked to the variation in pointing of the antenna and, in consequence, improve the estimate of the Doppler centroid.

Figure 7:
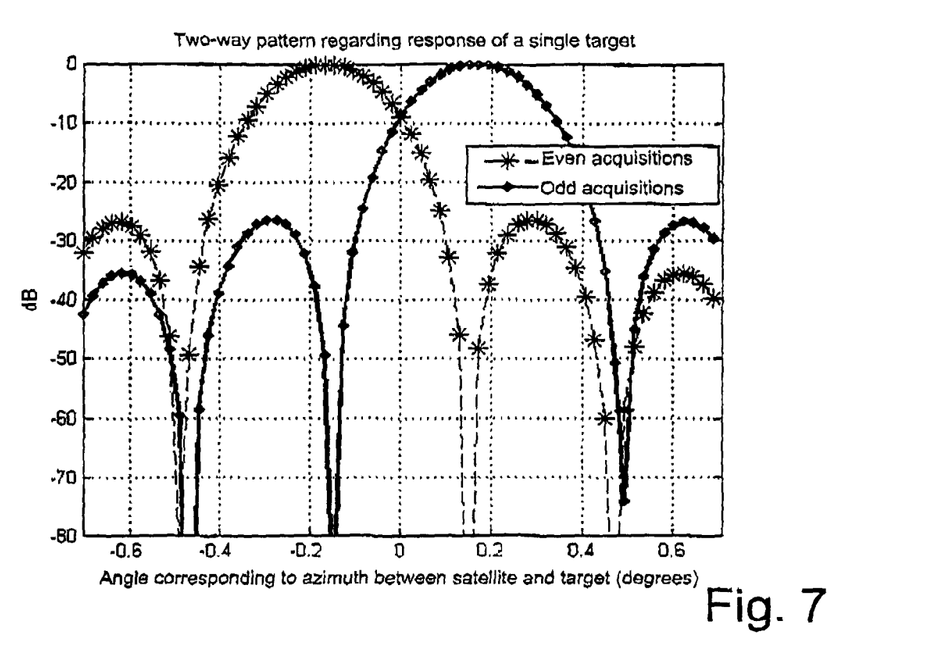
FIGS. 7 and 8 show results of simulations carried out by the applicant to validate the technique of BAR acquisition in stripmap mode according to said first aspect of the present invention.
Figure 8:
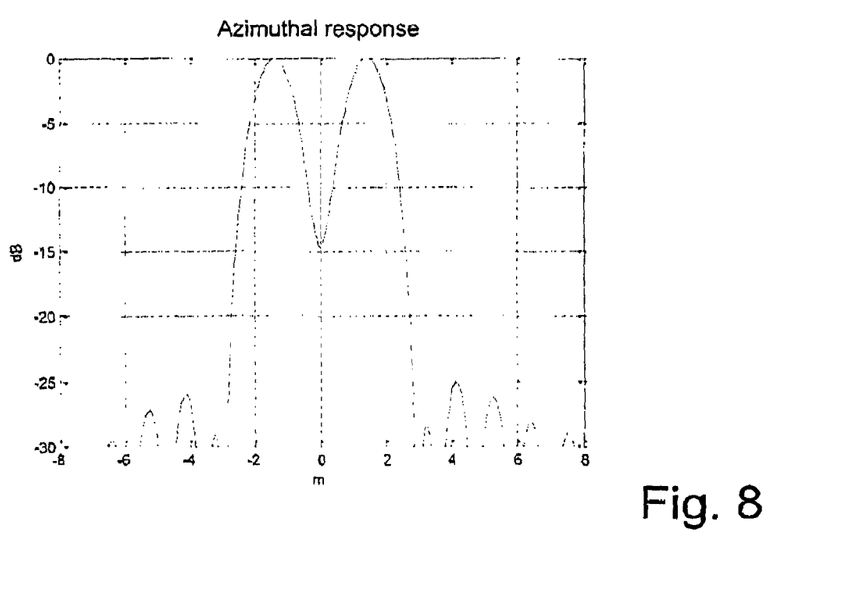

In order to better understand the characteristics and potentiality of the technique of SAR acquisition in stripmap mode according to the first aspect of the present invention, FIGS. 7 and 8 show the results of simulations performed by the applicant, assuming operation in the X-band with a planar antenna carried by a satellite and having a length of 5.6 meters (and always in the case where N=2).

In particular, FIG. 7 shows the intensity of the two-way pattern regarding response of a single target. As can be inferred from the graph in FIG. 7, the technique of SAR acquisition in stripmap mode according to the first aspect of the present invention enables doubling (multiplying by a factor of N in the generic case) the persistence time of the SAR sensor on the target (i.e. doubling the integration time) and therefore halving (or dividing by a factor of N in the generic case) the resolution (i.e. improving it by a factor of N).

FIG. 8 shows the azimuth response obtained by simulating the presence of two targets 2.8 meters apart, i.e. half the size of the antenna. In the graph in FIG. 8, the two targets are quite distinct as the achieved resolution is significantly less (approximately half, or approximately a quarter of the antenna's size) than the value contemplated by traditional techniques (approximately half the physical or equivalent length of the antenna).

As is known, the parameter that describes the sensitivity characteristics of a SAR image, a parameter from which the characteristics of the antenna, as well as the principle radar parameters such as transmission power are derived, is NESZ (Noise Equivalent Sigma Zero), for which the following law of proportionality holds:

$$NESZ \propto \frac{P_T L_P}{G_T G_R PRF},$$

where $G_T$ indicates the antenna gain in transmission, $G_R$ indicates the antenna gain in reception, $L_p$ indicates the loss due to integration of the antenna's non-ideal pattern, and $P_T$ indicates the transmitted power.

As previously described, the method of SAR acquisition according to the first aspect of the present invention allows achieving a better (up to N times) azimuth resolution for acquisitions in stripmap mode with respect to that obtainable with conventional techniques (approximately half the physical or equivalent length of the antenna).

The difference will now be analysed, in terms of sensitivity, between two systems that have the same resolution, but with one using a traditional technique based on using an antenna having half the physical or equivalent length L and the other using the innovative technique according to the first aspect of the present invention and based on the use of an antenna that is longer by a factor of N, that is to say having a length N×L.

An antenna N times longer results in an N-fold increase in gain, both in transmission and reception. As previously described, the PRF used in processing is N times smaller, i.e. the single target is focused using a number of samples N times smaller.

Due to the presence of the cusp (with regard to this, reference can be made, for example, to FIG. 7) the integration might be slightly higher with respect to the traditional case. However, this value, which depends on the shape of the antenna beam and the value of N, is not significant.

Summarizing, it follows that;

$$\frac{NESZinv}{NESZtrad} \approx \frac{1}{N},$$

where NESZinv indicates the NESZ associated with the technique according to the first aspect of the present invention and NESZtrad indicates the NESZ associated with the traditional stripmap technique.

Therefore, with the technique according to the first aspect of the present invention there is a considerable increase in product sensitivity, namely it is possible detect a signal with an intensity N times smaller. In consequence, said technique according to the first aspect of the present invention can also be used to reduce the transmission power, and therefore to reduce the technological complexities.

The following Table 1 summarizes the advantages and drawbacks, for the same performance in azimuth resolution, of the technique according to the first aspect of the present invention with respect to the traditional one.

TABLE 1

|  | Advantages | Drawbacks |
|---|---|---|
| Technology | Lower transmission power Much lower power density (transmitted power divided by antenna surface) | Need to rapidly adjust antenna pointing (at PRI level) |
| Bulk |  | Larger antenna |
| Flexibility | system is compatible with lower PRF modes; Strip/Spot/Scan acquisitions over larger swath |  |

In order to better highlight the advantages obtained by using the technique according to the first aspect of the present invention with respect to the traditional one, comparisons for the same product performance and the same size in elevation are listed in Tables 2 and 3 below.

In particular, the data shown below in Table 2 has been obtained by the applicant assuming a satellite application with a satellite height of approximately 619 Km, an antenna size in the range of approximately 1.5 m, a resolution of 1 m×1 m, a swath width greater than 10 Km (between 13 and 15 Km depending on the elevation angle), a NESZ of approximately −24 dBm²/m² and a PRF in the range between 9300 Hz and 10500 Hz.

TABLE 2

|  | Traditional stripmap technique with an antenna having an azimuth size of 1.9 m | Stripmap technique according to the first aspect of the present invention with an antenna having an azimuth size of 3.8 m and with N = 2 | Stripmap technique according to the first aspect of the present invention with an antenna having an azimuth size of 5.8 m and with N = 3 |
|---|---|---|---|
| Transmitted power [KW] | ≈24 | ≈14 | ≈9 |
| Transmitted power density [KW/m²] | ≈9 | ≈2.7 | ≈1.1 |
| Compatibility with azimuth resolution of 1 m and swath width of 13 Km | YES | YES | YES |
| Compatibility with azimuth resolution of 3 m and swath width of 40 Km | NO | NO | YES |
| Minimum PRF for Spot/Scan [Hz] | ≈9000 | ≈4500 | ≈3000 |

Furthermore, the data shown below in Table 3 has been obtained by the applicant assuming a satellite application with a satellite height of approximately 619 Km, an antenna size in the range of approximately 1.5 m, a resolution of 1.5 m×1.5 m, a swath width of approximately 20 Km, a NESZ of approximately −24 dBm²/m² and a PRF in the range between 6200 Hz and 7000 Hz.

TABLE 3

|  | Traditional stripmap technique with an antenna having an azimuth size of 2.9 m | Stripmap technique according to the first aspect of the present invention with an antenna having an azimuth size of 5.8 m and with N = 2 |
|---|---|---|
| Transmitted power [KW] | ≈17 | ≈9 |
| Transmitted power density [KW/m²] | ≈4.5 | ≈1.1 |
| Compatibility with azimuth resolution of 1.5 m and swath width of 20 Km | YES | YES |
| Compatibility with azimuth resolution of 3 m and swath width of 40 Km | NO | YES |
| Minimum PRF for Spot/Scan [Hz] | ≈6000 | ≈3000 |

As can be interred from the data shown in the foregoing tables, the technique according to the first aspect of the present invention enables producing, or in any case significantly reducing the critical areas of, SAR systems with stripmap products having metric resolution and increases the type of products that can be obtained with already designed/operational SAR systems.

As has hitherto been described, the technique according to the first aspect of the present invention enables simultaneously acquiring N stripmap images. In particular, these images, according to said first aspect of the present invention, are obtained with different squint angles to increase the azimuth resolution.

In order not to alter the image quality parameters, the PRF used with the technique according to the first aspect of the present invention is greater than the natural one of the antenna. By increasing the PRF, the swaths in range that can be acquired are smaller. Thus, a second aspect of the present invention regards a technique of SAR acquisition in stripmap mode that does not use an increased PRF, or in any case not increased by a factor of N, so as to control the effects on the product and manage the induced degradation.

In particular, said second aspect of the present invention relates to a so-called burst-mode stripmap technique that is not interleaved at PRI level, i.e. where the N stripmap acquisitions are not performed by varying the antenna's acquisition direction in azimuth at PRI level, but by varying the antenna's acquisition direction in azimuth in PRI blocks.

Specifically, the second aspect of the present invention concerns a burst-mode stripmap technique in which the N stripmap acquisitions are performed without increasing the PRF and by varying the azimuth acquisition direction of the antenna, namely the squint angle used, in PRI blocks.

The burst-mode stripmap technique with unincreased PRF and variation of the squint angle according to the second aspect of the present invention enables improving the azimuth resolution N times without deteriorating the swath in range, that is to say without altering the size of the swath in range. In particular, this technique enables achieving azimuth resolutions N times smaller than half the physical or equivalent length of the antenna used (i.e. azimuth resolutions N times better with respect to those of traditional stripmap techniques).

In order to divide the acquisition in two (N in the generic case) and assuming to use the natural nominal PRF of the antenna used, "holes" are introduced in the acquisition scheme. If these holes do not have periodic characteristics, the effect will be a distributed raising of all the lateral lobes, i.e. the ISLR (Integrated Side Lobe Ratio) parameter deteriorates, but not the PSLR (Peak Side Lobe Ratio). Vice versa, by using periodic execution patterns for the two (N in the generic case) types of acquisition, paired echoes in a known position are created. Depending on requirements, various solutions can be chosen and then a given pattern applied in the acquisition logic. Since a lower number of samples will be integrated, the product will have an impaired NESZ parameter.

Figure 9:
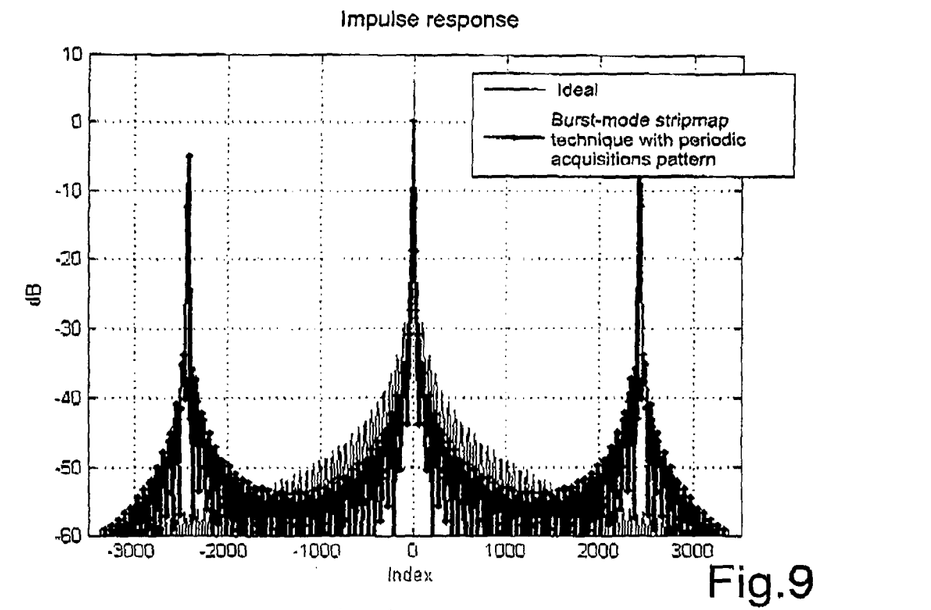
FIGS. 9 and 10 schematically show effects of applying a first acquisition strategy in performing a technique of SAR acquisition in stripmap mode according to a second aspect of the present invention.
Figure 10:
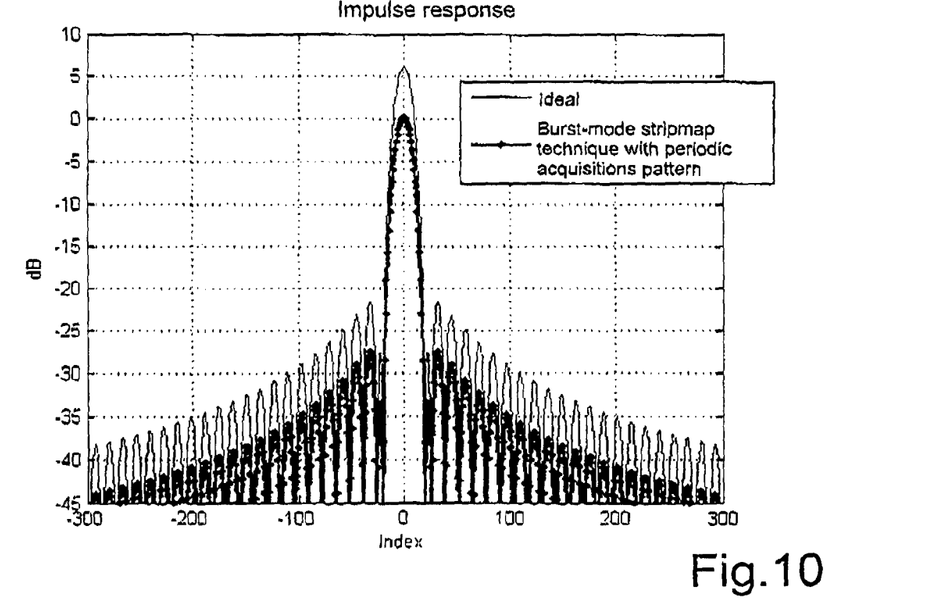
Figure 11:
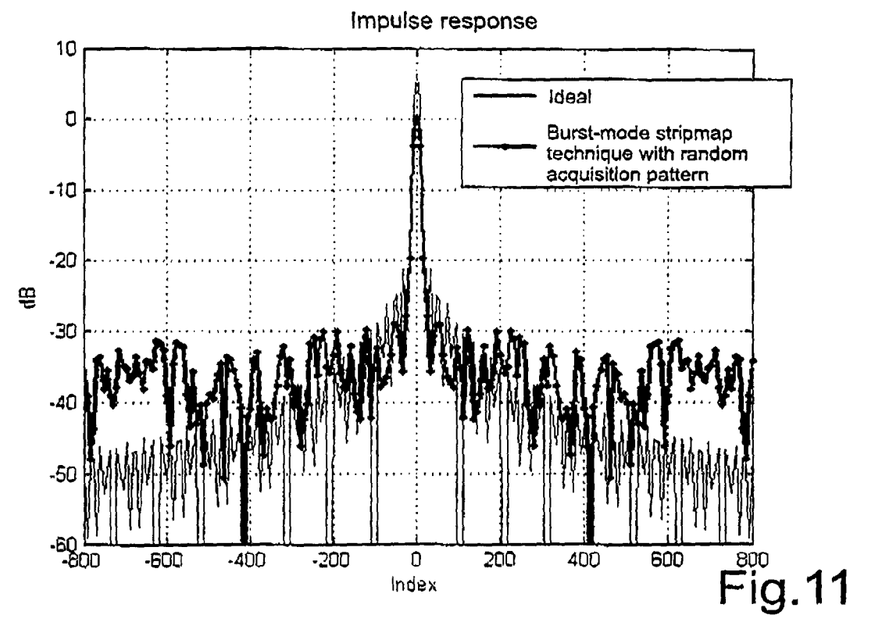
FIGS. 11 and 12 schematically show effects of applying a second acquisition strategy in performing the technique of SAR acquisition in stripmap mode according to the second aspect of the present invention.
Figure 12:
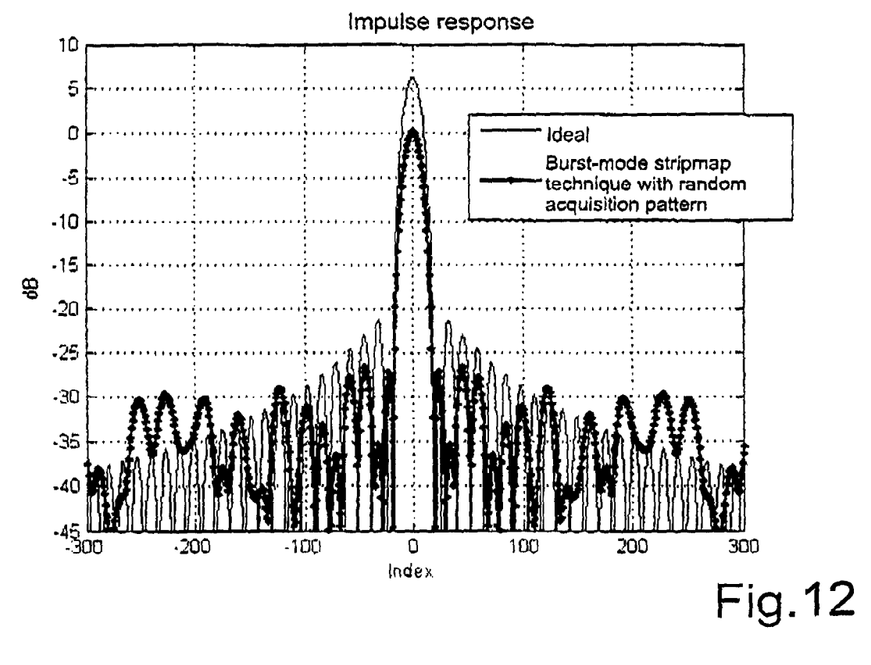

By way of example, FIGS. 9 and 10 show the effects of applying a periodic execution pattern of the N types of acquisition with the burst-mode stripmap technique with unincreased PRF according to the second aspect of the present invention, while FIGS. 11 and 12 show the effects of applying a random execution pattern of the N types of acquisition with the burst-mode stripmap technique with unincreased PRF according to the second aspect of the present invention.

With respect to the technique according to the first aspect of the present invention, the technique according to the second aspect introduces less technological constraints because the switching of the antenna beam takes place at a considerably lower frequency.

Briefly summarizing, the present invention concerns;
the use of a PRF increased by a factor of N and the interleaved use of N different squint angles at PRI level to improve the azimuth resolution N times, i.e. to obtain an azimuth resolution with a numerical value smaller by a factor of N with, respect to the numerical value of the nominal azimuth resolution of the stripmap mode (said numerical value of the nominal azimuth resolution of the stripmap mode, as previously explained, being equal to L/2, where L indicates the physical or equivalent length along the azimuth direction of the SAR antenna used); and the use of an unincreased PRF and the burst use of N different squint angles to improve the azimuth resolution N times, i.e. to obtain an azimuth resolution with a numerical value smaller by a factor of N with respect to the numerical value of the nominal azimuth resolution of the stripmap mode (i.e. L/2).

In conclusion, the present invention exploits multi-beam acquisition logic that enables achieving stripmap acquisitions with extreme resolutions comparable to those of spotlight mode, thereby overcoming the constraint on azimuth resolution linked to the width of the antenna beam. The present invention also enables managing the energy radiated in a more efficient manner, reducing the power required to guarantee the sensitivity value established for the product (reducing the power in transmission and the power density in transmission).

The present invention therefore not only increases the range of products for systems already produced, but, above all, introduces a new methodology for designing new SAR systems.

Finally, after having compared the present invention with the traditional spotlight and stripmap modes, the main differences from the known techniques of high-resolution wide-swath SAR image generation previously described will now be described as well.

In particular, unlike the present invention, the burst techniques (e.g. ScanSAR and TOPS) envisage deterioration of azimuth resolution in order to increase the swath in range.

Unlike the present invention, which functions with a single receiving channel (i.e. with a single receiver), the space-division techniques (e.g. DPC and HEWS) and the angle-division ones (e.g. MEB and SPCMB) envisage the use of M systems for simultaneous reception and also envisage the use of a small antenna (typically, an antenna is partitioned into M smaller antennas).

The BiDi mode described in Ref1 has a different purpose, that of Moving Target Identification (MTI) and therefore does not have the object of improving azimuth resolution. Furthermore, the acquisition geometry is different from that of the present invention and the beams lack azimuth continuity. With regard to this, it should be noted that, as explicitly described in sections III C and III D and as clearly illustrated in FIG. 11 of Ref1, the radar beams used (in the specific BiDi mode described in the above-mentioned sections III C and III D and illustrated in the above-mentioned FIG. 11 of Ref1) for the forward acquisition and for the backward acquisition are separated in azimuth, while according to the present invention they are contiguous. In confirmation of what has just been said, it should be noted that the integration times shown in FIG. 11 of Ref1 are separate and not contiguous. Therefore, as the beams are not contiguous along the azimuth and, consequently, neither are the integration times contiguous, it is not possible to synthesize a larger aperture, i.e. it is not possible to obtain a longer integration time (as happens in the present invention; for example, according to the first aspect of the present invention, the integration time is increased by a factor of N) and, in consequence, it is not possible to improve the azimuth resolution. In particular, the forward and backward acquisitions shown in FIG. 11 of Ref1 each serve to generate a respective SAR image with the maximum nominal resolution in azimuth of the stripmap mode (i.e. L/2), but cannot be used (because the beams are not contiguous along the azimuth and, consequently, neither are the integration times contiguous) to generate a single SAR image with improved azimuth resolution (i.e. with resolution smaller than L/2) as happens in the present invention. The foregoing considerations are confirmed by the end applications of the BiDi mode. In fact, the applications of the BiDi mode described in Ref1 are only of the MTI type for measuring the speed with which a target/scene moves and does not contemplate an increase in azimuth resolution of a SAR image acquired in stripmap mode as is envisaged in the present invention.

Furthermore, it should also be noted that Ref2 has antenna-level implementation logic and not acquisition logic as the present invention. In addition, as can be inferred from FIG. 3 of Ref2, the acquisitions are separated by a significant space with respect to the antenna's swath and have repeatability characteristics. The bursts do not guarantee continuous sampling of the azimuth spectrum with the natural frequency (PRF) of the antenna, i.e. there is no temporal continuity in the bursts regarding a same swath and therefore, unlike that envisaged by the present invention, the best achievable azimuth resolution is worse than the nominal one of the stripmap mode (i.e. L/2). In particular, the geometry shown in FIG. 3 of Ref2 is that typical of the ScanSAR mode. Finally, it should also be noted that section 5 of Ref3 presents the ScanSAR mode, i.e. a mode that acquires multiple sub-swaths in range with bursts that are not contiguous in time. The bursts are sequential and of shorter duration with respect to those obtainable in stripmap mode, and therefore, contrary to that envisaged by the present invention, there is deterioration in azimuth resolution with reference to the nominal resolution of the stripmap mode (i.e. L/2). Furthermore, FIG. 10 of Ref3 does not show acquisition logic, but only describes the PRF values that can be chosen depending on the distance of the scene. In particular, according to that shown in FIG. 10 of Ref3, synchronous bursts are envisaged on the individual areas in range, thereby forcing degradation of azimuth resolution.

In conclusion, it is clear that various modifications can be applied to the present invention without departing from the scope of the invention, as defined in the appended claims.

The invention claimed is:

1. SAR imaging method comprising performing N SAR acquisitions in stripmap mode of areas of the earth's surface by means of a synthetic aperture radar (20) that is transported by an aerial or satellite platform and which comprises a single, non-partitioned antenna and a single receiver coupled to said single, non-partitioned antenna, N being an integer greater than one;
wherein the single, non-partitioned antenna of the synthetic aperture radar (20) is associated with a nominal pulse repetition frequency;
wherein all N SAR acquisitions in stripmap mode are performed using one and the same predetermined elevation angle with respect to the nadir of the synthetic aperture radar (20) so that said N SAR acquisitions in stripmap mode all regard one and the same specific swath of the earth's surface;
wherein each SAR acquisition in stripmap mode is performed using a respective squint angle with respect to the flight direction of the synthetic aperture radar (20), said respective squint angle being different from the squint angles used for performing the other N-1 SAR acquisitions in stripmap mode;
wherein each performed SAR acquisition in stripmap mode comprises respective radar transmission and reception operations that:
are time interleaved, individually or in groups, with single, or groups of, radar transmission and reception operations of the other N-1 SAR acquisitions in stripmap mode performed; and
comprise the transmission and reception of respective radar beams in respective acquisition directions that are defined by the predetermined elevation angle and by the respective squint angle used for said SAR acquisition in stripmap mode, thereby resulting in that said respective acquisition directions are parallel to each other and not parallel to the acquisition directions of the other N-1 SAR acquisitions in stripmap mode performed;
wherein the radar beams transmitted and received in two radar transmission and reception operations performed in two immediately successive time instants and related to two different SAR acquisitions in stripmap mode are contiguous along the azimuth, thereby increasing the integration times with respect to those obtainable via any one of the N SAR acquisitions in stripmap mode performed; and
wherein the radar transmission and reception operations are performed by:
using an operational repetition frequency that is N times greater than the nominal pulse repetition frequency; or
varying the squint angle used in pulse repetition interval blocks; the method further comprising generating SAR images of areas of the specific swath on the basis of all the N SAR acquisitions in stripmap mode performed, said SAR images having an azimuth resolution that is enhanced by a factor up to N with respect to a nominal stripmap azimuth resolution that is equal to half the physical or equivalent length along the azimuth direction of the single, non-partitioned antenna of the synthetic aperture radar (20).

2. The method of claim 1, wherein the respective radar transmission and reception operations of each performed SAR acquisition in stripmap mode are individually time interleaved with single radar transmission and reception operations of the other N-1 SAR acquisitions in stripmap mode performed;
and wherein the radar transmission and reception operations are performed with an operational repetition frequency equal to N times the nominal pulse repetition frequency so that each of the N SAR acquisitions in stripmap mode is performed with the nominal pulse repetition frequency.

3. The method of claim 2, wherein generating SAR images comprises:
estimating Doppler centroid values on the basis of raw data obtained from all the N SAR acquisitions in stripmap mode performed (block 63); and
processing the raw data obtained from each of the N SAR acquisitions in stripmap mode performed by using the estimated Doppler centroid values and data indicative of a respective pointing of the single, non-partitioned antenna of the synthetic aperture radar (20), thereby obtaining N spectra, each of which is related to a respective SAR acquisition in stripmap mode performed;
frequency combining the N spectra related to the N SAR acquisitions in stripmap mode performed, thereby obtaining a single final spectrum having a size N times that of each of said N spectra (block 68); and generating a SAR image of an area of the specific swath on the basis of the final spectrum (block 69).

4. The method of claim 3, wherein processing the raw data obtained from each of the N SAR acquisitions in stripmap mode performed includes:

for each performed SAR acquisition in stripmap mode, applying a Fast Fourier Transform to the raw data obtained from said SAR acquisition, thereby obtaining a respective raw spectrum (blocks 61 and 62);

for each performed SAR acquisition in stripmap mode, performing filtering and frequency alignment of the respective raw spectrum on the basis of the estimated Doppler centroid values and data indicative of the respective pointing of the single, non-partitioned antenna of the synthetic aperture radar (20), thereby obtaining a respective spectrum correctly positioned in frequency (blocks 64 and 65); and, for each performed SAR acquisition in stripmap mode, applying an equalization of amplitude modulation to the respective spectrum correctly positioned in frequency, thereby obtaining a respective equalized spectrum (blocks 66 and 67);

and wherein frequency combining the N spectra related to the N SAR acquisitions in stripmap mode performed includes frequency combining the N equalized spectra (block 68).

5. The method of claim 1, wherein the respective radar transmission and reception operations of each performed SAR acquisition in stripmap mode are time interleaved, in groups, with groups of radar transmission and reception operations of the other N-1 SAR acquisitions in stripmap mode performed;

and wherein the radar transmission and reception operations are performed with an operational repetition frequency comparable to the nominal pulse repetition frequency.

6. The method of claim 5, wherein the groups of radar transmission and reception operations of the N different SAR acquisitions in stripmap mode are time interleaved according to a periodic or random interleaving pattern.

7. Synthetic aperture radar system (20) that comprises a single, non-partitioned antenna and a single receiver coupled to said single, non-partitioned antenna; and is configured to perform the SAR imaging method claimed in claim 1.

* * * * *